(12) United States Patent
Debling

(10) Patent No.: US 6,973,592 B2
(45) Date of Patent: Dec. 6, 2005

(54) ON-CHIP EMULATOR COMMUNICATION

(75) Inventor: Anthony Debling, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 520 days.

(21) Appl. No.: 09/981,646

(22) Filed: Oct. 16, 2001

(65) Prior Publication Data
US 2002/0046016 A1    Apr. 18, 2002

(30) Foreign Application Priority Data
Oct. 18, 2000    (GB) .................................... 0025593

(51) Int. Cl.$^7$ .......................................... G06F 11/00
(52) U.S. Cl. .......................... 714/30; 714/27; 703/23; 703/28
(58) Field of Search ............................ 714/28, 29, 30, 714/27; 703/20, 28; 712/227

(56) References Cited

U.S. PATENT DOCUMENTS

| | | | |
|---|---|---|---|
| 4,860,290 A | 8/1989 | Daniels et al. | |
| 5,173,904 A | 12/1992 | Daniels et al. | |
| 5,329,471 A | 7/1994 | Swoboda et al. | |
| 5,535,331 A | 7/1996 | Swoboda et al. | |
| 5,684,721 A | 11/1997 | Swoboda et al. | |
| 5,911,059 A * | 6/1999 | Profit, Jr. ...................... | 703/23 |
| 6,032,268 A | 2/2000 | Swoboda et al. | |
| 6,085,336 A | 7/2000 | Swoboda et al. | |
| 6,311,292 B1 * | 10/2001 | Choquette et al. ............. | 714/30 |
| 6,516,428 B2 * | 2/2003 | Wenzel et al. ................. | 714/28 |
| 6,647,511 B1 * | 11/2003 | Swoboda et al. ............. | 714/30 |
| 6,691,251 B2 * | 2/2004 | Wong .......................... | 714/28 |
| 6,732,311 B1 * | 5/2004 | Fischer et al. ............... | 714/737 |
| 2001/0039633 A1 * | 11/2001 | Swoboda et al. ............. | 714/28 |
| 2001/0056555 A1 * | 12/2001 | Deao et al. .................... | 714/28 |
| 2002/0059541 A1 * | 5/2002 | Swoboda ...................... | 714/28 |

FOREIGN PATENT DOCUMENTS

| | | | |
|---|---|---|---|
| DE | 001058189 A2 * | 6/2000 | |
| WO | WO 98 09208 A | 3/1998 | |
| WO | WO 00 57587 A | 9/2000 | |

OTHER PUBLICATIONS

U.S. Appl. No. 60/219,340.*
Standard Search Report from British application No. 0025591, filed Oct. 18, 2001.
Standard Search Report from RS 105936.
*BDM/JTAG Debuggers*, Lauterback Technical Manuals, Aug. 9, 2000, XP002161412.
*New Debugger for Direct connection to USB*, Lauterback press releases, Jan. 2, 1999, XP002161413.

* cited by examiner

*Primary Examiner*—Robert Beausoliel
*Assistant Examiner*—Christopher McCarthy
(74) *Attorney, Agent, or Firm*—Lisa K. Jorgenson; James H. Morris; Wolf, Greenfield & Sacks, P.C.

(57) ABSTRACT

An integrated circuit chip comprising embedded digital processor and an on-chip emulation device coupled to said digital signal processor, said emulation device being operable to control said digital processor and to collect information about the operation of said digital processor, the on-chip emulation device having a communication port for off-chip communication, the chip further comprising an on-chip interface having a first port connected to said communication port of said on-chip emulation device and a second port for connection to a non-proprietary bus wherein said interface is operable to convert between a format suitable for said on-chip emulation device and a format suitable for said non-proprietary bus.

15 Claims, 1 Drawing Sheet

ON-CHIP EMULATOR COMMUNICATION

FIELD OF THE INVENTION

The present invention relates to an integrated circuit chip having a digital processor and comprising an on-chip emulation device.

BACKGROUND OF THE INVENTION

Known techniques for debugging embedded digital processors include the use of on-chip emulation devices whose function is to monitor and control the operation of the digital processor. Such on-chip emulation devices typically have storage capability, and the ability to initiate command and control sequences for the digital processor in response to externally applied signals from a host computer or to detected states of the digital processor.

Communication between the on-chip emulation device and the host computer is carried out via a link, which is typically a link designed for the particular application. As a result, signals over the link may be tailored to the particular on-chip emulation device in the interests of efficient debugging.

There is however a problem in that the use of a specialized link requires use of only a physical link dedicated to the system, and also requires the host computer to be dedicated to the production of signals for the on-chip emulation device of concern.

It is an object of the present invention to at least partially mitigate the above-mentioned difficulties.

SUMMARY OF THE INVENTION

According to a first aspect of the present invention there is provided an integrated circuit chip comprising embedded digital processor and an on-chip emulation device coupled to said digital signal processor, said emulation device being operable to control said digital processor and to collect information about the operation of said digital processor, the on-chip emulation device having a communication port for off-chip communication, the chip further comprising an on-chip interface having a first port connected to said communication port of said on-chip emulation device and a second port for connection to a non-proprietary bus wherein said interface is operable to convert between a format suitable for said on-chip emulation device and a format suitable for said non-proprietary bus.

In one embodiment said integrated circuit chip comprises plural embedded digital processors, each having a respective associated on-chip emulation device and a respective said on-chip interface, said integrated circuit chip further including said non-proprietary bus, and a bus connection port connected on said chip via said non-proprietary bus to the second port of each said interface.

In another embodiment said integrated circuit chip comprises a single digital processor.

Two non-proprietary bus systems are currently becoming used in digital communication, namely USB (universal serial bus) and IEEE 1394 ("firewire").

These two technologies provide serial bus connections with a generally flexible architecture. USB is typically applied to connecting peripherals to a host computer, either directly or via a hub which provides port expansion. Operating at 12 Mb/s USB provides simple connectivity due to its ability to operate in a plug and play environment.

IEEE 1394. is a high performance peer-to-peer interface bus which allows devices which are connected via the bus to act as though they were in slots within a computer sharing a common memory space. Both asynchronous and isochronous transfer is possible, with speeds in excess of 100 Mb/s.

Both USB and IEEE 1394 use their own plugs and sockets.

In a preferred embodiment said non-proprietary bus is a universal serial bus.

Preferably said bus connection port is a universal serial bus hub.

In a second embodiment said non-proprietary bus is a bus complying with IEEE standard 1394.

Advantageously the or each digital processor further comprises JTAG circuitry connected to said bus.

Conveniently said JTAG circuitry has a further off-chip connection.

According to a second aspect of the invention there is provided a method of communicating with a digital processor on an integrated circuit chip, said chip having on-chip emulation circuitry for monitoring and controlling the digital processor in response to signals from a host computer, said chip further comprising interface circuitry disposed between a port of said on-chip emulation circuitry and a communication port for said signals, wherein said port is adapted to receive a non-proprietary bus and wherein said non-proprietary bus is adapted to convey signals having a predetermined protocol, the method comprising:

connecting said non-proprietary bus to said port and to a said host computer;

from said host computer, providing said signals on said non-proprietary bus using said protocol;

receiving said signals at said communication port and transferring said signals to said interface circuitry on-chip; in said interface circuitry, converting said signals into a form suitable for said on-chip emulation circuitry, and transferring said converted signals to said on-chip emulation circuitry whereby said on-chip emulation circuitry responds to said converted signals to monitor and control said digital processor.

Preferably said chip further comprises peripheral circuitry, and said on-chip emulation circuitry is linked to said peripheral circuitry for control and monitoring thereof.

Preferably again said non-proprietary bus is a universal serial bus and said predetermined protocol is a universal serial bus protocol.

Advantageously said integrated circuit chip further comprises JTAG circuitry connected to said interface circuitry, and the method further comprises:

supplying test signals over said universal serial bus to said interface circuitry;

in said interface circuitry converting said test signals into JTAG protocol form; and supplying said JTAG protocol signals to said JTAG circuitry whereby said JTAG circuitry implements boundary test functions of said chip.

Conveniently the method further comprises causing said on-chip emulation circuitry to determine data illustrative of the behaviour of said chip said signals comprise interrogating signals for said on-chip emulation circuitry, whereby said on-chip emulation circuitry derives information from said data to said interface;

in said interface, converting said information into universal serial bus protocol; and transmitting said information in universal serial bus protocol over said universal serial bus to said host.

Embodiments of the invention will now be described, by way of example only, with reference to the accompanying drawings.

BRIEF DESCRIPTION OF THE DRAWINGS

In the various figures, like reference numerals indicate like parts.

DESCRIPTION OF THE PREFERRED EMBODIMENTS

Figure 1:
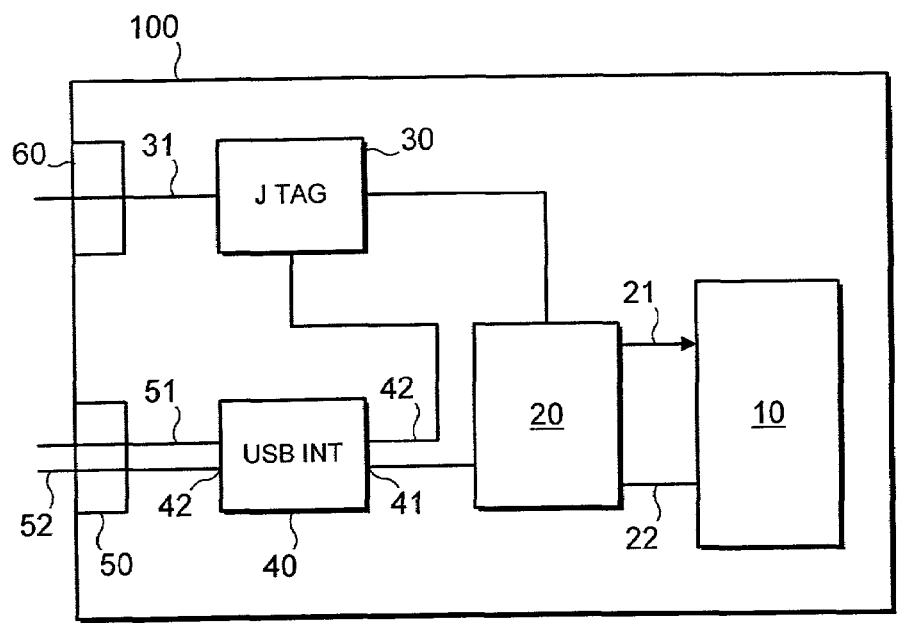
FIG. 1 shows a partial block schematic diagram of a first embodiment of an integrated circuit chip in accordance with the present invention.

Referring first to FIG. 1, an embedded system includes an integrated circuit chip 100 which comprises a processor 10 on said chip. As used herein, the term 'processor' includes microprocessors and digital signal processors. The processor is connected to other component circuitry of said embedded system in a manner known to those skilled in the art.

At least during debugging of said embedded system, it is advantageous to be able to collect information about the operation of the processor and also to supply control and command information to said processor, both in response to conditions on the processor itself, and also in response to information conveyed from a host computer.

Known technology for collecting information about operation of the processor and for controlling the processor includes a so-called "on-chip emulator" which typically comprises storage and processing circuitry for that purpose. Such an on-chip emulator 20 is shown schematically on FIG. 1 as having a control path 21 connected to the digital signal processor 10 and having an information-collecting path 22 from the digital signal processor 10.

Typically the on-chip emulator 20 has associated JTAG circuitry 30 connected to it, as known to those skilled in the art, for carrying out boundary testing of the chip.

To enable ready connection to a host device, the chip further comprises a USB interface circuit 40. The USB interface 40 has a first port 41 connected to the on-chip emulator 20, a second port 42 connected on-chip to a USB port 50 via a universal serial bus 51. The USB interface circuitry also has a further port 42 connected to the JTAG circuitry 30 which in turn has an on-chip connection 31 to a JTAG port 60.

A universal serial bus is, in use, connected to the USB port 50. the universal serial bus 52 connects at its other end to a host device, typically a debugging computer having a USB port.

Debugging may take place using the host device; however by virtue of the USB connection, it may be possible to debug from a more remote location, as will be later described herein.

Figure 2:
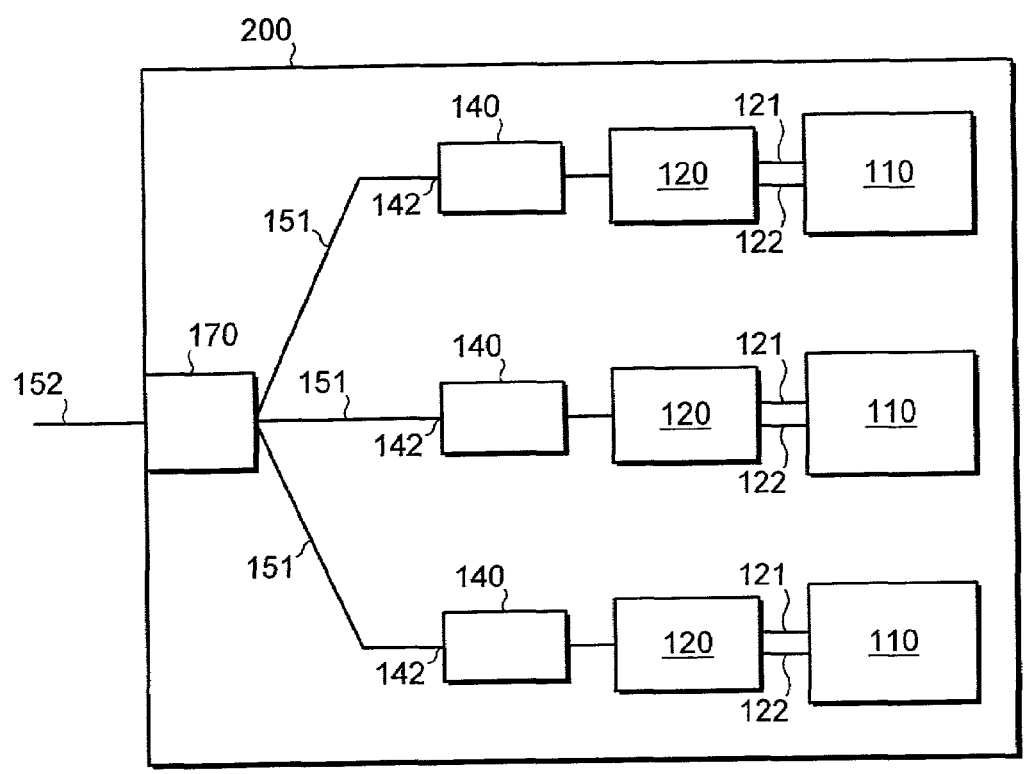
FIG. 2 shows a partial block schematic diagram of a second embodiment of an integrated circuit chip in accordance with the present invention.

Referring now to FIG. 2, a second integrated circuit chip 200 comprises plural, here 3, embedded digital signal processors 110, each having a respective associated on-chip emulator 120 connected to it via a respective control path 121 and information collecting path 122. Each on-chip emulator 120 is connected to respective USB interface circuitry 140 and each USB interface circuitry 140 has a USB input port 142 to which is connected an on-chip universal serial bus 151 which connects to an on-chip USB hub 170. JTAG circuitry as shown in FIG. 1 may also be provided but is here emitted for the sake of clarity.

The USB hub 170 has an input for a universal serial bus 152, whereby debugging occurs.

The universal serial bus provides the ability to download programs and monitor and control the processor (so-called "peek" and "poke") in combination with a remote or host system. The bus also allows a general bi-directional communication path between the host and target system.

Moreover, by use of the on-chip emulator and the bus there is provided a mechanism through which any processor or peripheral on-chip can remotely access "virtual" devices by means of a proxy process on the host. As an example, a program running on a processor on a chip is able to execute a "socket call" which packages the parameters of the call into a packet. The packet is then sent back over the bus to the host or to an intermediate device which then unwraps the parameters and makes the real "socket call". Such a technique can be used for any software function call.

The use of a universal serial bus also enables a route for a host program to configure and control silicon components on a highly integrated device. It enables programming of any on-chip EEPROM and for production programming diagnostics.

During the debugging phase the universal serial bus enables coherent control and graphical representation and behaviour of systems on silicon with one or more processors.

Connection of the universal serial bus to the JTAG circuitry allows for JTAG functions to be executed through the USB port although it should be borne in mind that a JTAG port would still be needed to allow daisy-chaining of other devices. It will be appreciated by those skilled in the art that whereas JTAG functions normally require a special adapter card this would not be the case using embodiments of the present invention.

Use of the universal serial bus allows the multiplexing together of the above-described functions using the bus. A hub would be needed on-chip to enable multiplexing at hardware level. Such a connection is advantageously realized using USB in the 12 Mb/s incarnation since this is in line with Ethernet.

In the state of the art, Ethernet chips are conventionally added at board level. Alternatively real-time hardware emulators are used which provide only limited functionality.

Using embodiments of the present invention having USB ports the need for a hardware emulator in the host ceases. Typically, the host may implement a simple proxy server to manage a USB port on the host and which deals with the data from components and functions in the target device. When a program running on the host needs to communicate to a device or service within the target system, that host program communicates to the proxy server which in turn connects it to the required part of the target. Services include program load and debug, configuration, visualisation, EEPROM programming, running diagnostics, implementation of virtual devices that can be accessed from any CPU within a multiprocessor, or multi CPU systems on silicon device. The embodiment is also capable of Internet access by a simple remote procedure call which requires only a small memory resource on the target which is communicated from the target to the proxy server on the host to convert the remote procedure call into a real socket call. It is envisaged to use a "plug-and-play" set-up for the USB driver.

An add-on to the device of the invention as a separate device which includes an embedded processor, a USB port on-chip, and Ethernet interface on-chip and some flash and on-chip memory. It may also be necessary if the on-chip memory is inadequate to provide an external memory interface for interfacing to external memory but it is envisaged that, as the amount of on-chip memory increases, such external memory is no longer required.

This add-on device allows the connection of a USB port on a target device to an Ethernet port.

It is also envisaged to provide either a hardware or software Modem on this device so that a target system can be connected to a telephone line, for example for allowing a manufacturer to assess the hardware of the target system from a remote location.

Using a similar system, a user can connect to the products that they themselves manufacture or distribute to allow for remote maintenance, meter reading, software upgrades and the like.

By provision of the Ethernet connection the system becomes networkable providing the usual benefits of networking. The use of the intelligent connection may be exploited, for example implementing some of the software processes on the intermediate processor, rather than the host. Typically such processes would be selected to be those which need a lot of interaction with a target such as filtering debug events or executing detailed configuration scripts. Embedded web server technology may be used to provide configuration and status information. The device is also capable of implementing protocols such as the Sun JINI—Java on the intermediate processor is unnecessary since a server on the host can be guaranteed to provide Java. As a result the system is capable of networked plug-and-play characteristics and allowing embedded silicon components to access JINI capabilities remotely.

As is known to those skilled in the art, the intermediate processor and the USB will require a definition of various protocols. It is envisaged that JavaScript bindings be created to these protocols which enable scripts to be written that load and execute programs, collect event information, program EEPROMs or run diagnostics. The use of JavaScript allows the script to run through a standard web browser interface which enables the development of intelligent browser-based Graphic User Interfaces for the on-chip emulators.

Using the devices described above, it is possible to adapt the conventional Internet addressing, using the uniform resource locator concept, to address intelligent agents inside a processor or other chip. This is permissible because the Internet model is not restricted to a globally-network of computers, but performs equally well within a chip having multiple intelligent agents. Thus sockets over the on-chip USB bus may be implemented from any intelligent agent on the device given the ability for intelligent agents to for example download required information (for example a new program) for itself from a defined Website. Like suitable connecting it is equally possible for a remote device to address intelligent agents inside the chip to control them, for example for setting memory configuration registers of a deeply embedded processor.

Although the embodiments have been described as connected via a universal serial bus (USB) it is envisaged that other standard buses could be substituted along with a change of interface. Specifically the IEEE 1394 bus discussed previously could be used instead.

What is claimed is:

1. An integrated circuit chip comprising an embedded digital processor and an on-chip emulation device, wherein said on-chip emulation device is contained entirely on-chip, coupled to said digital processor, said emulation device being operable to control said digital processor and to collect information about the operation of said digital processor, the on-chip emulation device having a communication port for off-chip communication, the chip further comprising an on-chip interface having a first port connected to said communication port of said on-chip emulation device and a second port for connection to a non-proprietary bus wherein said interface is operable to convert between a format suitable for said on-chip emulation device and a format suitable for said non-proprietary bus.

2. The integrated circuit chip of claim 1 having plural embedded digital processors, each having a respective associated on-chip emulation device and a respective said on-chip interface, said integrated circuit chip further including said non-proprietary bus, and a bus connection port connected on said chip via said non-proprietary bus to the second port of each said interface.

3. The integrated circuit chip of claim 1 wherein said non-proprietary bus is a universal serial bus.

4. The integrated circuit chip of claim 3 wherein said bus connection port is a universal serial bus hub.

5. The integrated circuit chip of claim 1 wherein said non-proprietary bus is a bus complying with IEEE standard 1394.

6. The integrated circuit chip of claim 1 wherein the or each digital processor further comprises JTAG circuitry connected to said bus.

7. The integrated circuit chip of claim 6 wherein said JTAG circuitry has a further off-chip connection.

8. A method of communicating between a remote device and a digital processor, said digital processor being on an integrated circuit chip, said chip having on-chip emulation circuitry, wherein said on-chip emulation circuitry is contained entirely on-chip, for monitoring and controlling the digital processor in response to signals from a said remote device, said chip further comprising interface circuitry disposed between a port of said on-chip emulation circuitry and a communication port for said signals, wherein said port is adapted to receive a non-proprietary bus and wherein said non-proprietary bus is adapted to convey signals having a predetermined protocol, the method comprising:

connecting said non-proprietary bus to said port and to a said remote device;

receiving said signals from said remote device over said non-proprietary bus in said non-proprietary protocol at said communication port and transferring said signals to said interface circuitry on-chip;

in said interface circuitry, converting said signals into a form suitable for said on-chip emulation circuitry, and transferring said converted signals to said on-chip emulation circuitry whereby said on-chip emulation circuitry responds to said converted signals to monitor and control said digital processor.

9. The method of claim 8 wherein said chip further comprises peripheral circuitry, and said on-chip emulation circuitry is linked to said peripheral circuitry for control and monitoring thereof.

10. The method of claim 8 wherein said non-proprietary bus is a universal serial bus and said predetermined protocol is a universal serial bus protocol.

11. The method of claim 10 wherein said integrated circuit chip further comprises JTAG circuitry connected to said interface circuitry, the method further comprising supplying test signals over said universal serial bus to said interface circuitry;

in said interface circuitry converting said test signals into JTAG protocol form; and supplying said JTAG protocol signals to said JTAG circuitry whereby said JTAG circuitry implements boundary test functions of said chip.

12. The method of claim 11 further comprising causing said on-chip emulation circuitry to determine data illustrative of behaviour of said chip said signals comprise interrogating signals for said on-chip emulation circuitry, whereby said on-chip emulation circuitry derives information from said data to said interface;

in said interface, converting said information into universal serial bus protocol; and transmitting said information in universal serial bus protocol over said universal serial bus to said host.

13. The method of claim 8 wherein said signals comprise program information for said EEPROM on said chip, and said on-chip emulation circuitry causes said EEPROM to become programmed in accordance with said program information.

14. The method of claim 8 wherein said signals comprise program information for production programming of memory of said chip, and said on-chip emulation circuitry causes said memory to become programmed in accordance with said program information.

15. A method of debugging a digital processor using a host computer, said digital processor being on an integrated circuit chip, said chip having on-chip emulation circuitry, wherein said on-chip emulation circuitry is contained entirely on-chip, for monitoring and controlling the digital processor in response to signals from said host computer, said chip further comprising interface circuitry disposed between a port of said on-chip emulation circuitry and a communication port for said signals, wherein said port is adapted to receive a non-proprietary bus and wherein said non-proprietary bus is adapted to convey signals having a predetermined protocol, the method comprising:

connecting said non-proprietary bus to said port and to a said host computer;

generating said signals in said host computer;

receiving said signals from said host computer over said non-proprietary bus in said non-proprietary protocol at said communication port and transferring said signals to said interface circuitry on-chip;

in said interface circuitry, converting said signals into a form suitable for said on-chip emulation circuitry, and transferring said converted signal to said on-chip emulation circuitry whereby said on-chip emulation circuitry responds to said converted signals to monitor and control said digital processor.

* * * * *